United States Patent
Chandersekaran et al.

(10) Patent No.: US 6,396,929 B1
(45) Date of Patent: May 28, 2002

(54) APPARATUS, METHOD, AND COMPUTER PROGRAM PRODUCT FOR HIGH-AVAILABILITY MULTI-AGENT CRYPTOGRAPHIC KEY RECOVERY

(75) Inventors: Sekar Chandersekaran, Potomac; Sohail Malik, Gaithersburg; Michael Muresan, Gaithersburg; Narayanan Vasudevan, Gaithersburg, all of MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,892

(22) Filed: Dec. 31, 1998

(51) Int. Cl.[7] .................................................. H04L 9/30
(52) U.S. Cl. ......................... 380/286; 713/181; 380/30
(58) Field of Search ................................ 713/151, 181; 380/21, 30, 286

(56) References Cited

U.S. PATENT DOCUMENTS

| | | | |
|---|---|---|---|
| 5,315,658 A | | 5/1994 | Micali |
| 5,557,346 A | | 9/1996 | Lipner et al. |
| 5,557,765 A | | 9/1996 | Lipner et al. |
| 5,631,961 A | | 5/1997 | Mills et al. |
| 5,647,000 A | | 7/1997 | Leighton |
| 5,675,649 A | * | 10/1997 | Brennan et al. ............... 380/21 |
| 5,796,830 A | * | 8/1998 | Johnson et al. ............... 380/21 |
| 5,815,573 A | * | 9/1998 | Johnson et al. ............... 380/21 |
| 5,907,618 A | * | 5/1999 | Gennaro et al. ............... 380/21 |
| 5,937,066 A | * | 8/1999 | Gennaro et al. ............... 380/21 |
| 6,052,469 A | * | 4/2000 | Johnson et al. ............. 380/286 |
| 6,058,188 A | * | 5/2000 | Chandersekaran et al. .... 380/25 |
| 6,061,454 A | * | 5/2000 | Malik et al. ................. 380/278 |
| 6,249,585 B1 | * | 6/2001 | McGrew et al. ............ 380/286 |

* cited by examiner

Primary Examiner—Gilberto Barron, Jr.
Assistant Examiner—Kambiz Zand
(74) Attorney, Agent, or Firm—Morgan & Finnegan, L.L.P.; Joseph C. Redmond, Jr.

(57) ABSTRACT

An apparatus, method, and computer program product for high-availability multi-agent cryptographic key recovery. The present invention defines a key recovery block that specifies allowable subsets of the total set of key recovery agents that can participate in a key recovery. For each subset, key recovery information is computed and stored after the subset is specified. This key recovery information is only useable by that subset because it is computed using that subset of public keys of the agents. When key recovery is initiated, a trusted processor (a key recovery coordinator) validates the contents of the key recovery block and it uses and is allowed to use any of the subsets of the agents to process the key recovery request. Since many subsets could be specified, the likelihood of key recovery failure is greatly diminished.

19 Claims, 13 Drawing Sheets

APPARATUS, METHOD, AND COMPUTER PROGRAM PRODUCT FOR HIGH-AVAILABILITY MULTI-AGENT CRYPTOGRAPHIC KEY RECOVERY

BACKGROUND OF THE INVENTION

1. Field of the Invention

This invention relates to a cryptographic key recovery system and, more particularly, to a high-availability multi-agent cryptographic key recovery system.

2. Description of the Related Art

Copending U.S. patent application filed herewith, Ser. No. 09/224,886 entitled "Apparatus, Method, And Computer Program Product For Achieving Interoperability Between Cryptographic Key Recovery Enabled And Unaware Systems," assigned to the International Business Machines Corporation, is incorporated herein by reference. This cited patent application describes a key recovery system.

U.S. patent application of D. B. Johnson et al., Ser. No. 08/629,815, now U.S. Pat. No. 5,815,573 filed Apr. 10, 1996, entitled "Cryptographic Key Recovery System" ("Johnson et al. I"), assigned to the International Business Machines Corporation, is incorporated herein by reference. This cited patent application describes a key recovery system using multiple key recovery agents.

U.S. patent application of D. B. Johnson et al., Ser. No. 08/681,679, now U.S. Pat. No. 5,796,830 filed Jul. 29, 1996, entitled "Interoperable Cryptographic Key Recovery System" ("Johnson et al. II"), assigned to the International Business Machines Corporation, is incorporated herein by reference. This cited patent application describes another key recovery system.

U.S. patent application of S. Chandersekaran et al., Ser. No. 08/971,204, now U.S. Pat. No. 6,355,972 filed Nov. 14, 1997, entitled "Frame-Work Based Cryptographic Key Recovery System" ("Chandersekaran et al."), assigned to the International Business Machines Corporation, is incorporated herein by reference. This cited patent application describes a key recovery system.

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies because the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (that is, systematically testing all possible keys until the right one is found). Such weak encryption systems have the obvious disadvantage that they are just as vulnerable to unauthorized third parties as they are to authorized government officials.

Various cryptographic key recovery systems have recently been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents, either by actually giving the key portions to the key recovery agents (in which case the key portions are said to be "escrowed") or by providing sufficient information in the communication itself (as by encrypting the key portions) to allow the key recovery agents to regenerate the key portions. Key recovery agents would reveal the escrowed or regenerated key portions to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the communicants' interest in privacy, since their encryption system retains its full strength against third parties and does not have to be weakened to comply with domestic restrictions on encryption or to meet export requirements. At the same time, key recovery systems serve the legitimate needs of law enforcement by permitting the interception of encrypted communications in circumstances where unencrypted communications have previously been intercepted (such as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

The term "key recovery" encompasses mechanisms that allow authorized third parties to retrieve the cryptographic keys used for data confidentiality, with the ultimate goal of recovery of encrypted data. There are two classes of key recovery mechanisms based on the ways keys are held to enable key recovery: key escrow and key encapsulation. Key escrow techniques are based on the paradigm that the government or a trusted third party called an "escrow agent," holds the actual user keys or portions thereof. Key encapsulation techniques, on the other hand, are based on the paradigm that a cryptographically encapsulated form of the key is made available to third parties that require key recovery; the encapsulation technique ensures that only certain trusted third parties called "recovery agents" can perform the unwrap operation to retrieve the key material buried inside. There may also be hybrid schemes that use some escrow mechanisms in addition to encapsulation mechanisms.

An orthogonal way to classify key recovery mechanisms is based on the nature of the key that is either escrowed or encapsulated. Some schemes rely on the escrow or encapsulation of long-term keys, such as private keys, while other schemes are based on the escrow or encapsulation of ephemeral keys such as session keys.

Since escrow schemes involve the actual archival of keys, they typically deal with long-term keys, in order to avoid the proliferation problem that arises when trying to archive myriad ephemeral keys. These long-term "escrowed" keys are then used to retrieve the ephemeral keys used for data confidentiality.

Key encapsulation techniques can also choose to archive the encapsulated keys, but usually they do not. Instead, these techniques usually operate on the ephemeral keys, and associate the encapsulated key with the actual enciphered message and thereby dispense with the archival process. The encapsulated key is put into a key recovery block that is generated by the party performing the data encryption, and associated with the encrypted data. To ensure the transmission and the integrity of the key recovery block, it may be required for processing by the party performing the data decryption. The processing mechanism ensures that successful data decryption cannot occur unless the key recovery block is processed successfully. Since the key recovery block has to be associated with the cryptographic session in some way, key encapsulation schemes may require the perturbation of the communication protocol used.

The process of cryptographic key recovery involves two major phases. First, parties that are involved in cryptographic associations have to perform an operation to enable key recovery (such as the escrow of use keys, or the generation of key recovery blocks, etc.)—this is typically called the "key recovery enablement" phase. Next, authorized third parties that desire to recover the data keys do so with the help of a recovery server and one or more escrow agents or recovery agents; this is the actual "key recovery service" phase.

One desirable characteristic of key recovery systems is referred to as "dispersion." A key recovery system having this feature requires the cooperation of multiple key recovery agents to recover a cryptography key. Because the cooperation of multiple key recovery agents is required, the possibility of abuse is reduced.

Schemes have been developed to enable the recovery of cryptographic keys using multiple agents in a key recovery system. In these systems, a key recovery block is generated to make a key recoverable only if all of the agents participate in the recovery process. If any agent is not available for any reason, then key recovery fails. This causes problems when a large scale deployment requires the use of many agents over a wide area network and not all agents are available all the time. Recoveries frequently fail because of the unavailability of one or more of the multiple key recovery agents.

SUMMARY OF THE INVENTION

The present invention is a method, apparatus, and computer program product for multiple agent key recovery where not all of the agents are required for the recovery process. The present invention defines a key recovery block that specifies allowable subsets of the total set of key recovery agents that can participate in a valid key recovery.

For each subset, key recovery information is computed and stored after the subset is specified. This key recovery information is only useable by the listed subset because it is computed using the public keys of that subset of agents.

When key recovery is initiated, a trusted processor (a key recovery coordinator) validates the contents of the key recovery block and it uses and is allowed to use any of the subsets of the agents to process the key recovery request. Since many subsets could be specified, the likelihood of key recovery failure is greatly diminished.

According to one aspect of the present invention, a method is provided for key recovery for use in a key recovery system having a set of key recovery agents to recover a cryptography key. The method includes the steps of receiving a key recovery request from a key recovery client; receiving a key recovery block containing a plurality of key recovery agent subsets, each containing a different subset of the key recovery agents in the set; determining the availability of the agents in one of the key recovery agent subsets; and, when all of the agents in that subset are determined to be available, requesting key information from those agents; receiving key information from those agents; generating a key based on the key information; and sending the key to the key recovery client.

According to another aspect of the present invention, a method is provided for generating a key recovery block in for use in a key recovery system having a set of key recovery agents to recover a cryptography key. The method includes the steps of generating a plurality of key recovery agent subsets, each containing a different subset of the key recovery agents in the set; generating key recovery information for each key recovery agent in each subset; and populating a key recovery block with the key recovery agent subsets and the key recovery information. According to one embodiment, the step of generating key recovery information includes the steps of encrypting the cryptography key using the public key of one of the key recovery agents to produce a result; and encrypting that result using the public key of a different one of the key recovery agents.

According to another aspect of the present invention, a key recovery block is provided for use in a key recovery system having a set of key recovery agents to recover a cryptography key. The key recovery block includes a subset number field that specifies a number of subsets S of the key recovery agents that can recover the cryptography key, and S subset fields. Each subset field has a key recovery agent number field that specifies the number of key recovery agents in the subset, and a plurality of key recovery agent fields, each specifying a key recovery agent and key recovery information for that key recovery agent.

Further features and advantages of the present invention, as well as the structure and operation of various embodiments of the present invention are described in detail below with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The preferred embodiment is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

Figure 1:
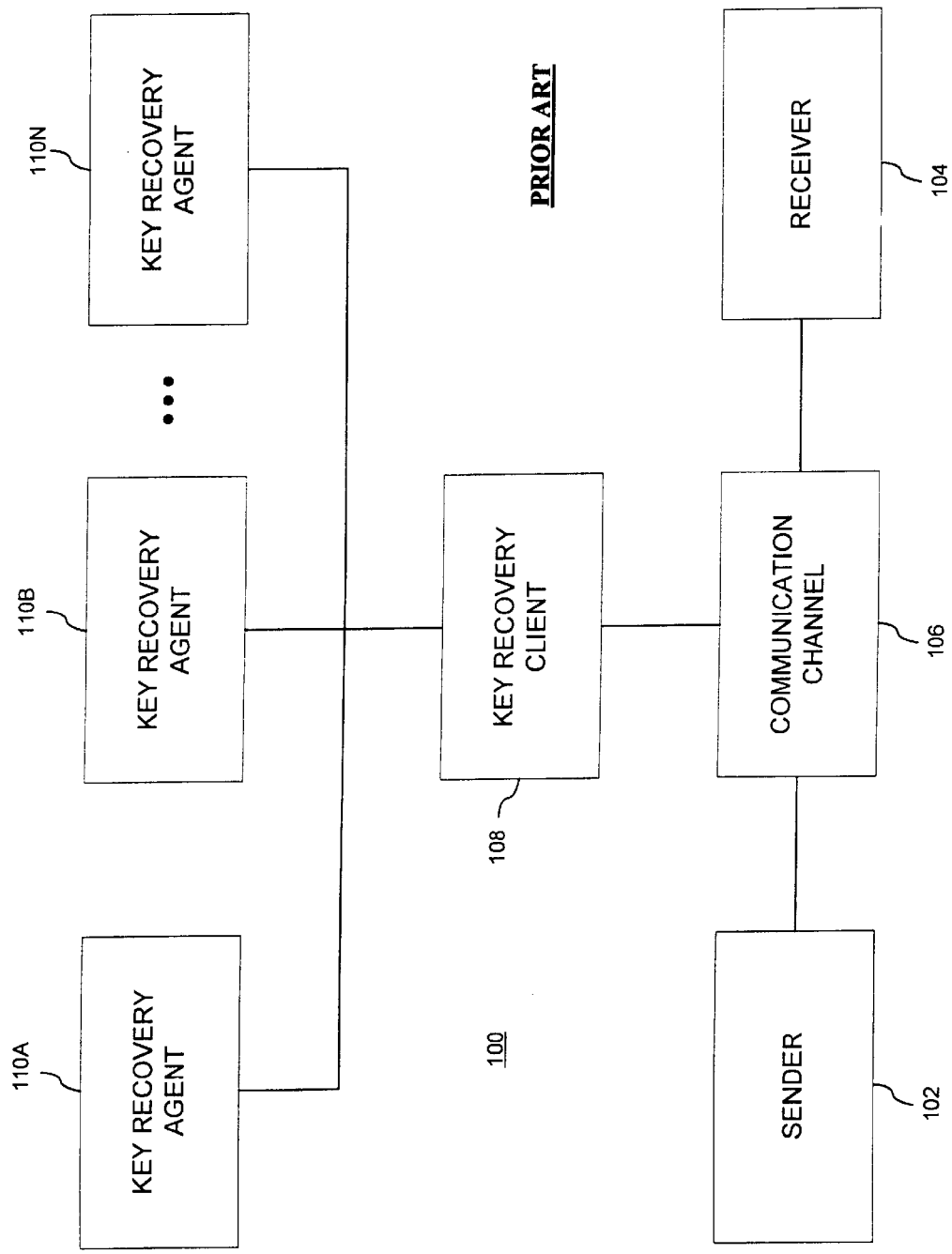
FIG. 1 shows a conventional key recovery system.

FIG. 1 shows a conventional key recovery system 100. In system 100, a sender 102 communicates with a receiver 104 by transmitting one or more encrypted messages (making up a communications session) over a communication channel 106. Sender 102 and receiver 104 may each comprise computer workstations, suitably programmed to provide the encryption and key recovery functions described below. Sender 102 and receiver 104 may be located in different countries or within a single country.

The transmitted messages are encrypted by sender 102 using a cryptographic key and decrypted by receiver 104 using a corresponding cryptographic key. In addition, at least one of the transmitted messages contains a conventional key recovery block, as described below.

A set of key recovery agents 110A–110N is provided. Collectively, key recovery agents 110 possess sufficient information to generate the cryptographic key using the key recovery block. However, no single agent 110 has sufficient information to generate the key. It is contemplated that the establishment of key recovery agents could take place as part of the establishment of a general public key infrastructure.

Communications over communication channel 106 are assumed to be subject to interception by third parties. An authorized third party, referred to herein as a key recovery client 108, can obtain the key by communicating with key recovery agents 110. Examples of key recovery clients include law enforcement agents, enterprises network managers, and individuals. Unauthorized third parties intercepting the encrypted communications will be unable to decipher the communications unless they successfully use one or more cryptanalytic techniques.

Figure 2:
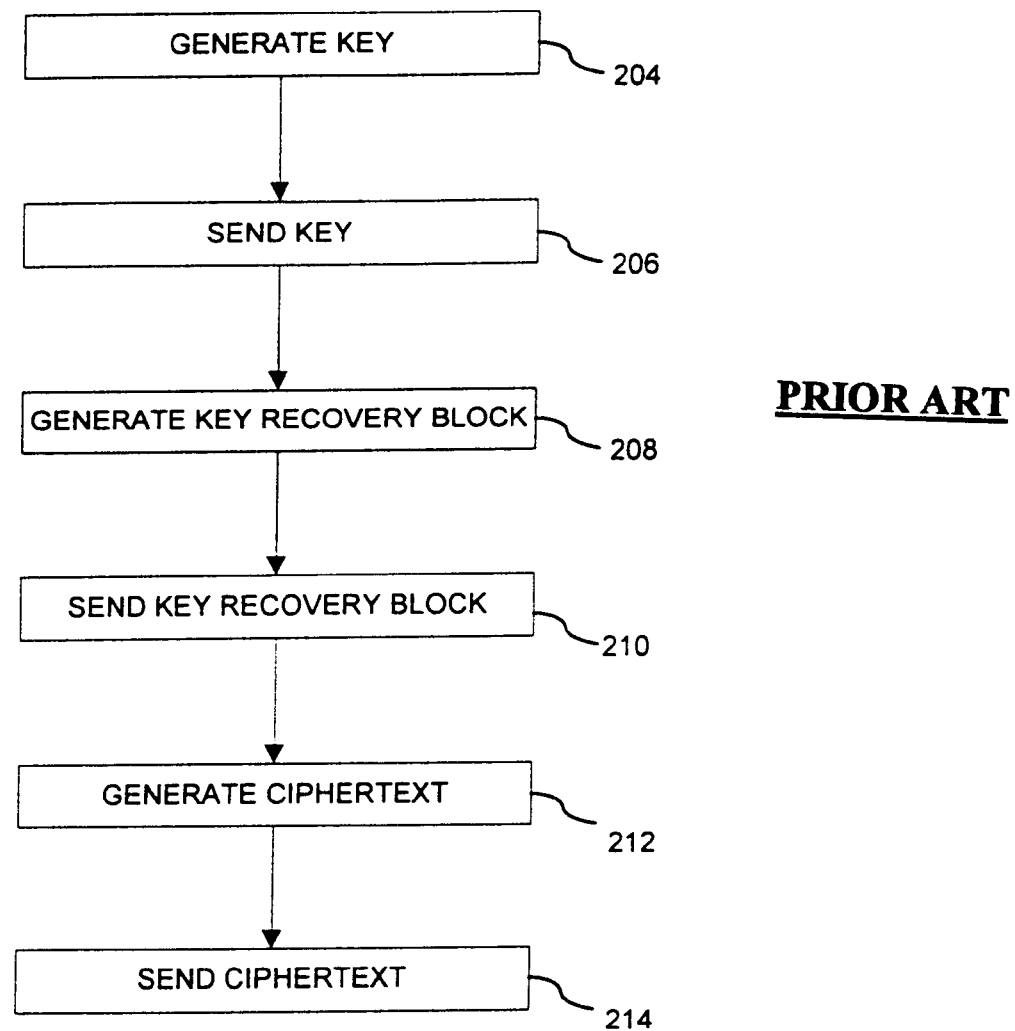
FIG. 2 is a flowchart depicting the operation of a conventional key recovery enablement process in a conventional key recovery system.

As described above, key recovery proceeds in two phases: key recovery enablement and key recovery service. FIG. 2 is a flowchart depicting the operation of a conventional key recovery enablement process in a conventional key recovery system such as that shown in FIG. 1. Key recovery enablement includes the generation by receiver 102 of a key recovery block and ciphertext produced using the key, and sending of this information to receiver 104. The key, key recovery block and ciphertext may be sent as a single message, or as separate messages, as would be apparent to those skilled in the relevant art.

First, a cryptographic key is generated, as shown in step 204. The generation of cryptographic keys is well known in the relevant arts. Sender 102 then sends this cryptographic key to receiver 102, as shown in step 206. The key may be sent using communication channel 106 or by some other means. Next, sender 102 generates a key recovery block as shown in step 208. Generation of the key recovery block will be described in detail below with reference to FIG. 3. Sender 102 transmits the key recovery block to receiver 104 using communication channel 106, as shown in step 210. Finally, sender 104 encrypts a plaintext message using the cryptographic key to generate ciphertext, as shown in step 212. Such encryption methods are well known in the relevant art. Sender 102 then transmits the ciphertext over communication channel 106 to receiver 104, as shown in step 214. Because both the key recovery block and ciphertext were sent over communication channel 106, they are available to key recovery client 108 because key recovery client 108 is monitoring communication channel 106.

Figure 3:
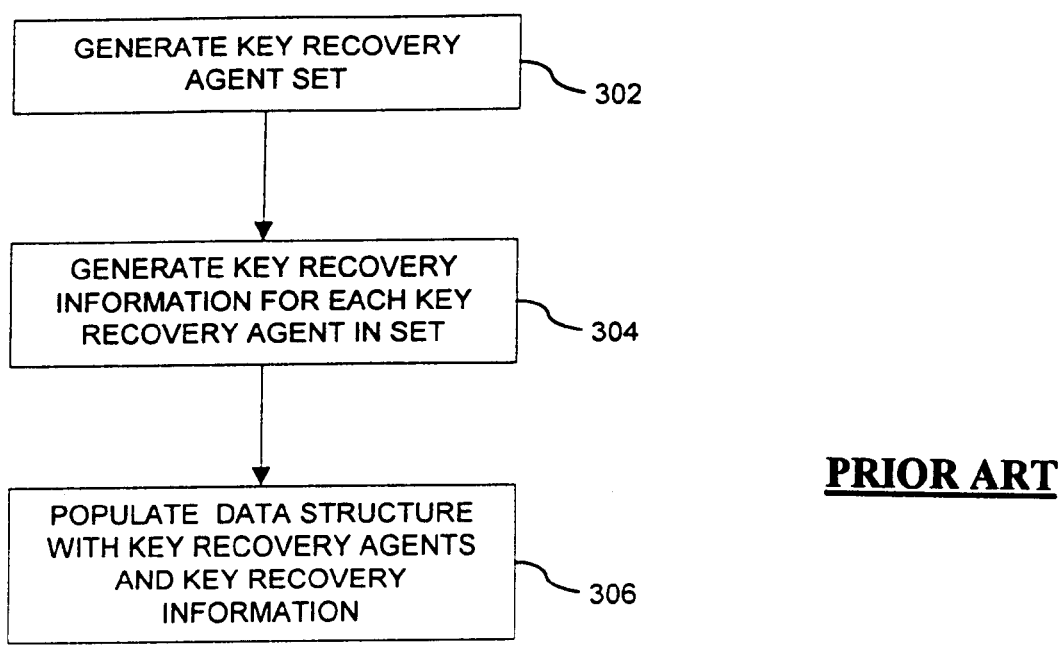
FIG. 3 is a flowchart depicting a conventional process for generating a conventional key recovery block.

FIG. 3 is a flowchart depicting a conventional process for generating a conventional key recovery block, and corresponds to step 208 of FIG. 2. First, sender 104 generates a set of key recovery agents that defines all of the key recovery agents required for key recovery, as shown in step 302. In general, the set of key recovery agents is specified well in advance of the communication session on a permanent basis for multiple communication sessions. Next, sender 102 generates key recovery information for each key recovery agent in the set, as shown in step 304. This key recovery information includes information sufficient for the key recovery agents to either collectively reconstruct the cryptographic key or to provide key recovery data that can be used to reconstruct the key. Finally, sender 102 populates a key recovery block with the key recovery agents and the key recovery information generated in steps 302 and 304, as shown in step 306.

Figure 4:
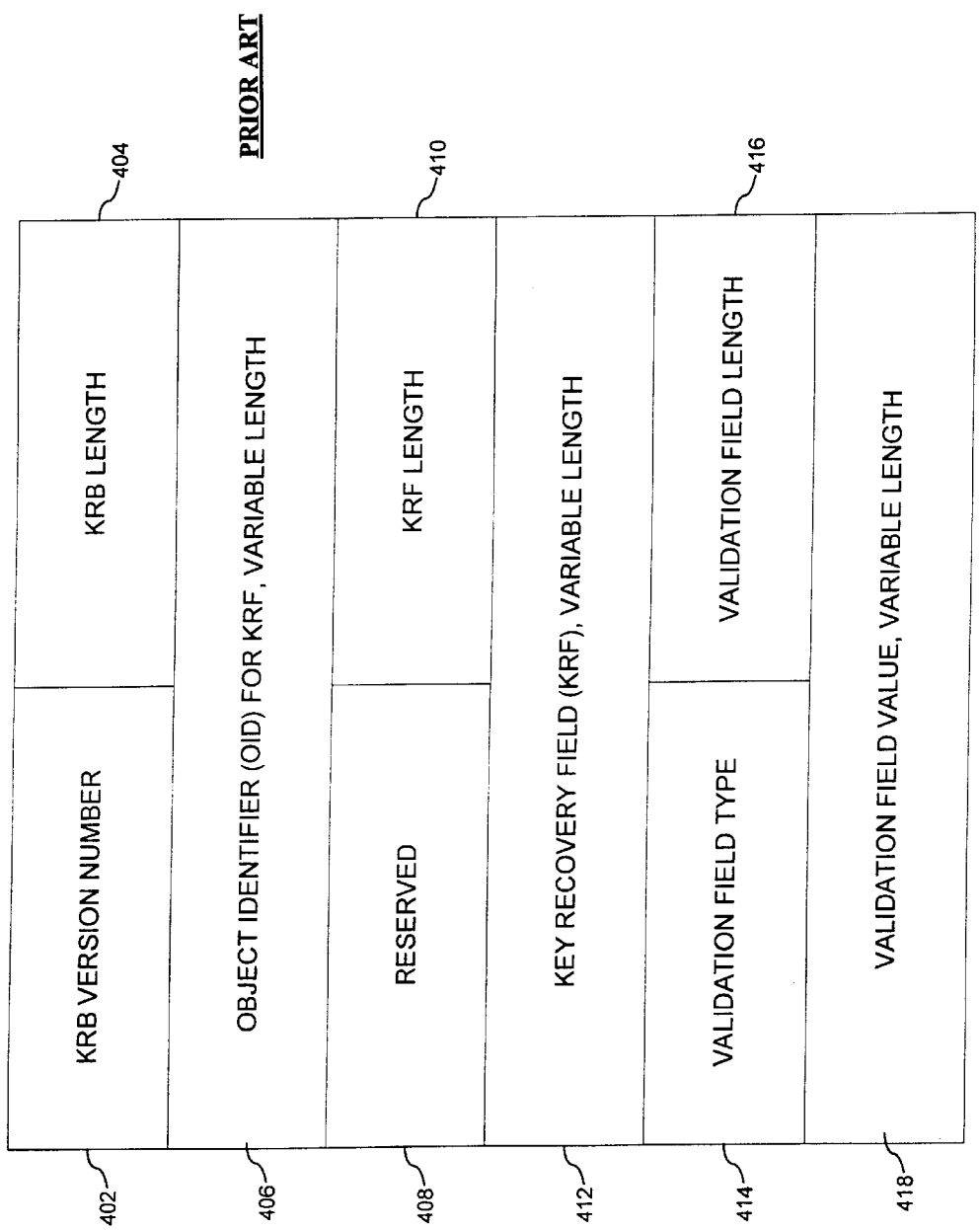
FIG. 4 depicts the format of a common key recovery block proposed by the Key Recovery Alliance.

FIG. 4 depicts the format of a common key recovery block 400 proposed by the Key Recovery Alliance and published in a document entitled "A Common Key Recovery Block Format: Promoting Interoperability Between Dissimilar Key Recovery Mechanisms, Version 1.1" by Sarbari Gupta, dated May 28, 1988, and available at the Key Recovery Alliance website, www.kra.org. For convenience, that information is summarized here.

KRB version number 402 specifies the version of the key recovery block format. KRB length 404 specifies the number of 32 bit words in the entire key recovery block 400. Object identifier 406 is a variable-length field that specifies the organization that is responsible for the key recovery mechanism and corresponding key recovery fields (KRF) The object identifier is ASN.1-encoded using DER rules. Block 408 is reserved. KRF length 410 specifies the number of 32 bit words in the key recovery field.

Key recovery field 412 is of variable length and specifies the key recovery information required to recover the key. This information includes the identity of the key recovery agents and the key recovery information required by each agent. The format and contents of key recovery fields 412 are specified by object identifier 406.

Validation field type 414 specifies the technique used to generate validation field 418. Validation field length 416 specifies the number of 32 bit words in the validation field value. Validation field value 418 is used for to verify that the key recovery block was not tampered with during transmission. The validation field value is calculated over the entire key recovery block.

Figure 5:
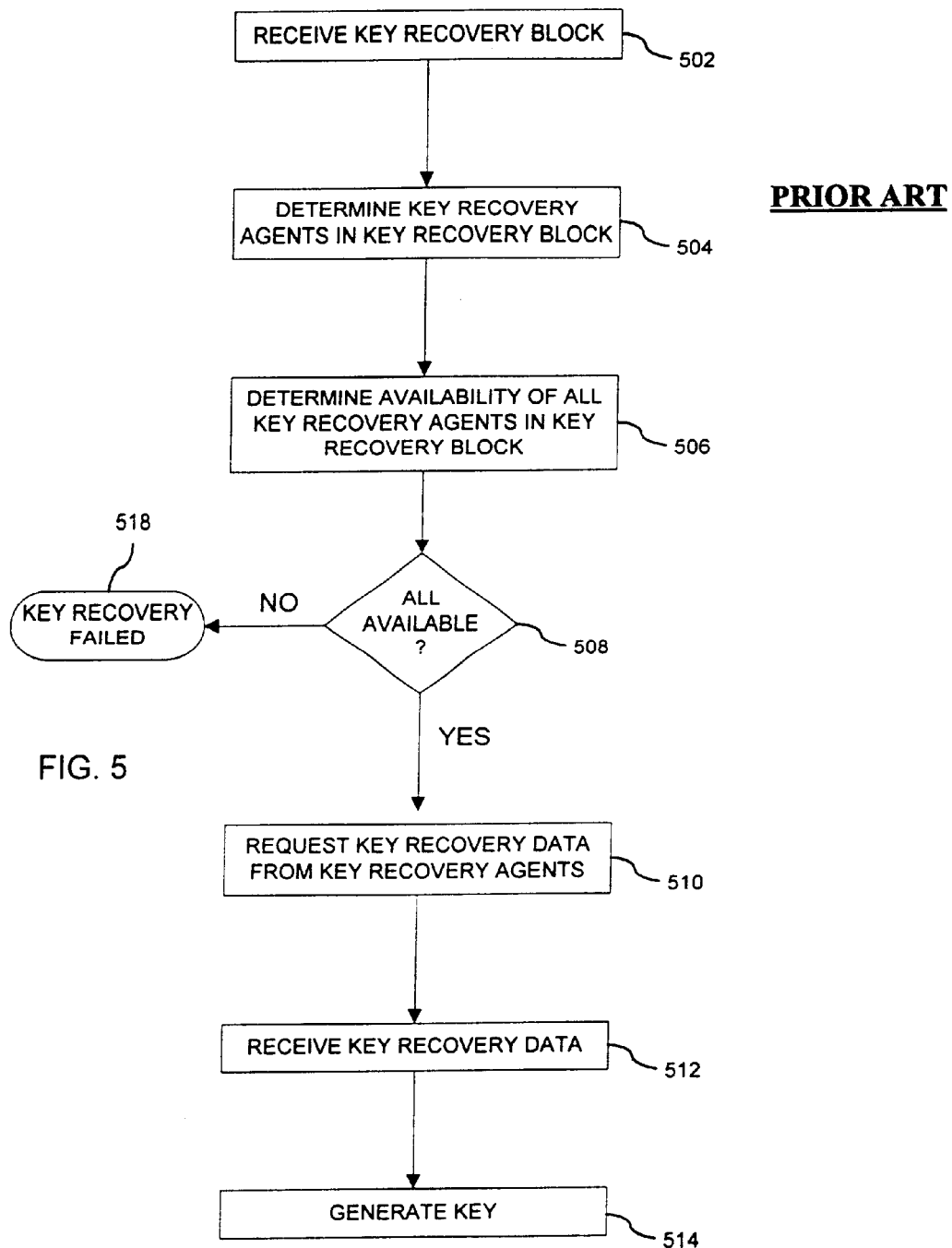
FIG. 5 is a flowchart depicting the operation of a conventional key recovery service in recovering a cryptographic key.

FIG. 5 is a flowchart depicting the operation of a conventional key recovery service in recovering a cryptographic key such as that generated in step 204 of FIG. 2 using a key recovery block such as that generated in step 208 of FIG. 2. Conventionally, this service is carried out by key recovery client 108. While monitoring communication channel 106, key recovery client 108 receives a key recovery block, as shown in step 502. Key recovery client 108 determines the key recovery agents specified in key recovery field 412 of key recovery block 400, as shown in step 504. In this example, the key recovery block specifies key recovery agents 110A through 110N. Key recovery client 108 then determines the availability of all of the key recovery agents 110A through 110N, as shown in step 506.

If all of the agents are available, as indicated by the "yes" branch from step 508, then the key recovery clients requests key recovery data from the key recovery agents as shown in step 510. After receiving this key recovery data, as shown in step 512, key recovery client 108 generates the key, as shown in step 514.

However, if any key recovery agent 110 is not available, as indicated by the "no" branch from step 508, then the key recovery operation fails, as shown in step 518. In order for a conventional multi-agent key recovery service to successfully complete, all of the key recovery agents specified by the key recovery block 400 must be available.

Figure 6:
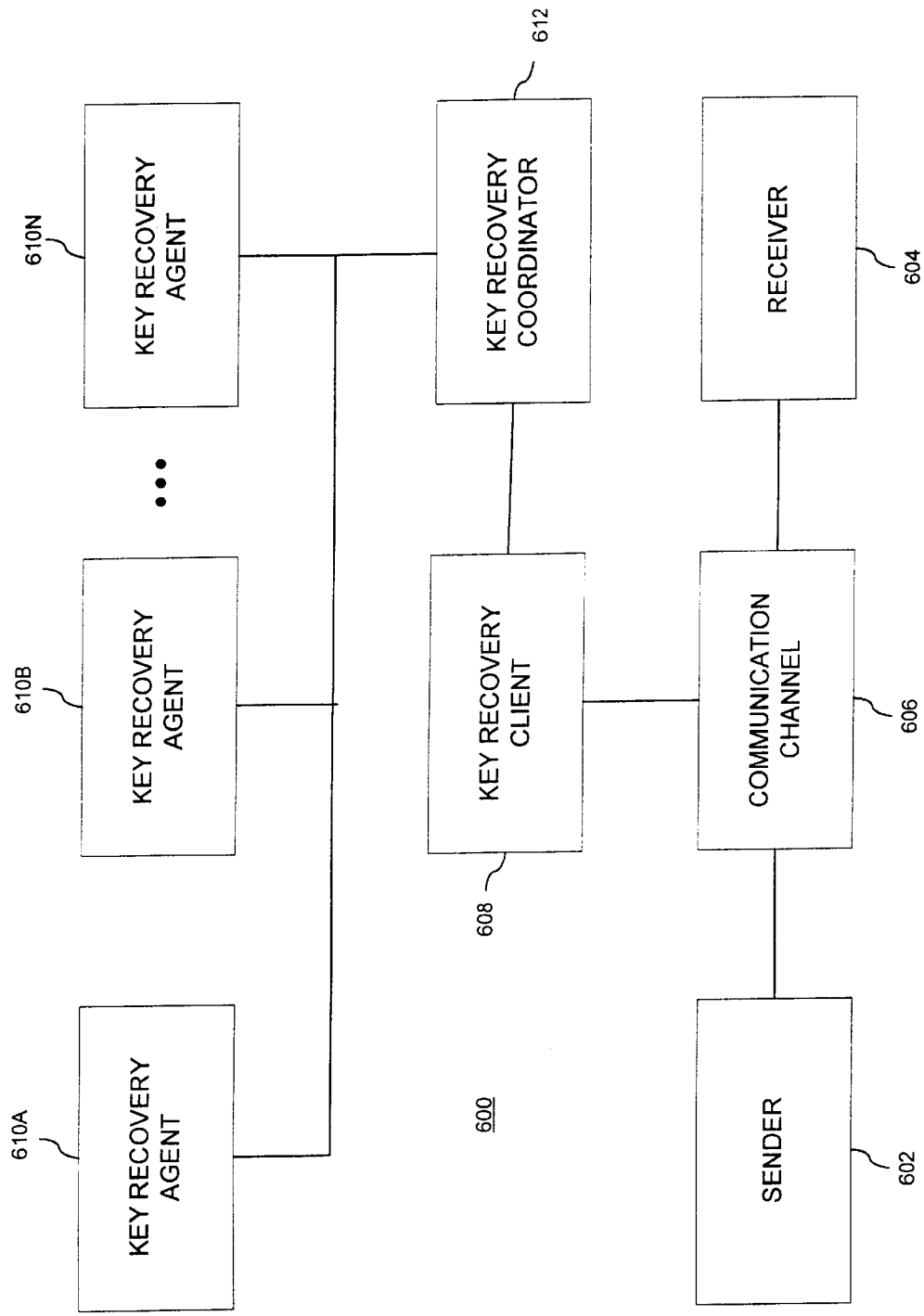
FIG. 6 depicts a key recovery system according to a preferred embodiment of the invention.

In contrast to conventional systems such as that described above, the present invention provides a key recovery system that enables key recovery when one or more key recovery agents are unavailable. FIG. 6 depicts a key recovery system 600 according to a preferred embodiment of the invention. In system 600, a sender 602 encrypts messages using a cryptographic key and generates a key recovery block. These are sent to receiver 604 using communication channel 606. If necessary, the cryptographic key can be sent by communication channel 606, or by any other means, as would be apparent to one skilled in the art. A key recovery client 608 monitors communication channel 606. In response to key recovery requests from key recovery client 608, a key recovery coordinator 612 provides key recovery service with the help of key recovery agents 610A–610N.

In a preferred embodiment, sender 602 and receiver 604 each employ a Frame-Work Based Cryptographic Key Recovery System such as that described in Chandersekaran et al. For convenience, such a system is now briefly described with reference to FIG. 7.

System 700 includes an application 702. Application 702 can be any application that requires communication services, such as an electronic mail program. Application 702 is coupled to a protocol handler 704. Protocol handler 704 provides communication services over communication channel 606 in response to commands and data passed from application 702. In the preferred embodiment, the communication protocol employed is TCP/IP.

Protocol handler 704 is coupled to a cryptography handler 706. Cryptography handler 706 fulfills requests from protocol handler 704 to generate cryptography keys, to encrypt plaintext using cryptography keys to create ciphertext, to decrypt ciphertext using cryptography keys to produce plaintext, and to provide key recovery services.

Cryptography handler 706 is coupled to a policy module 708. Policy module 708 contains rules regarding the handling of messages encrypted with, or to be encrypted using, strong cryptographic methods. These polices can be established by law enforcement agencies, enterprises, individuals, and the like. For example, one policy mandated by the United States is to provide any cryptographic systems destined for export with a suitable key recovery method to be employed whenever strong cryptography is used. Cryptography handler 706 consults policy module 708 whenever strong cryptography is requested by protocol handler 704. For example, in the system destined for export from the United States, any request for strong cryptography from protocol handler 704 will, in accordance with the rules in policy module 708, be provided with key recovery.

In a preferred embodiment, the key recovery and cryptography services are modularized. Therefore, these services need not be provided by the same entity that provided cryptography handler 706. This allows a purchaser of a cryptography system to purchase these three elements from different vendors if desired.

Cryptography handler 706 is coupled to key recovery service provider (KRSP) 710. In response to requests from cryptography handler 706, KRSP 710 generates key recovery blocks and provides other key recovery services as described below.

Cryptography handler 706 is also coupled to cryptography service provider (CSP) 712. In response to requests from cryptography handler 706, CSP 712 generates cryptographic keys and provides other cryptography services.

Figure 8:
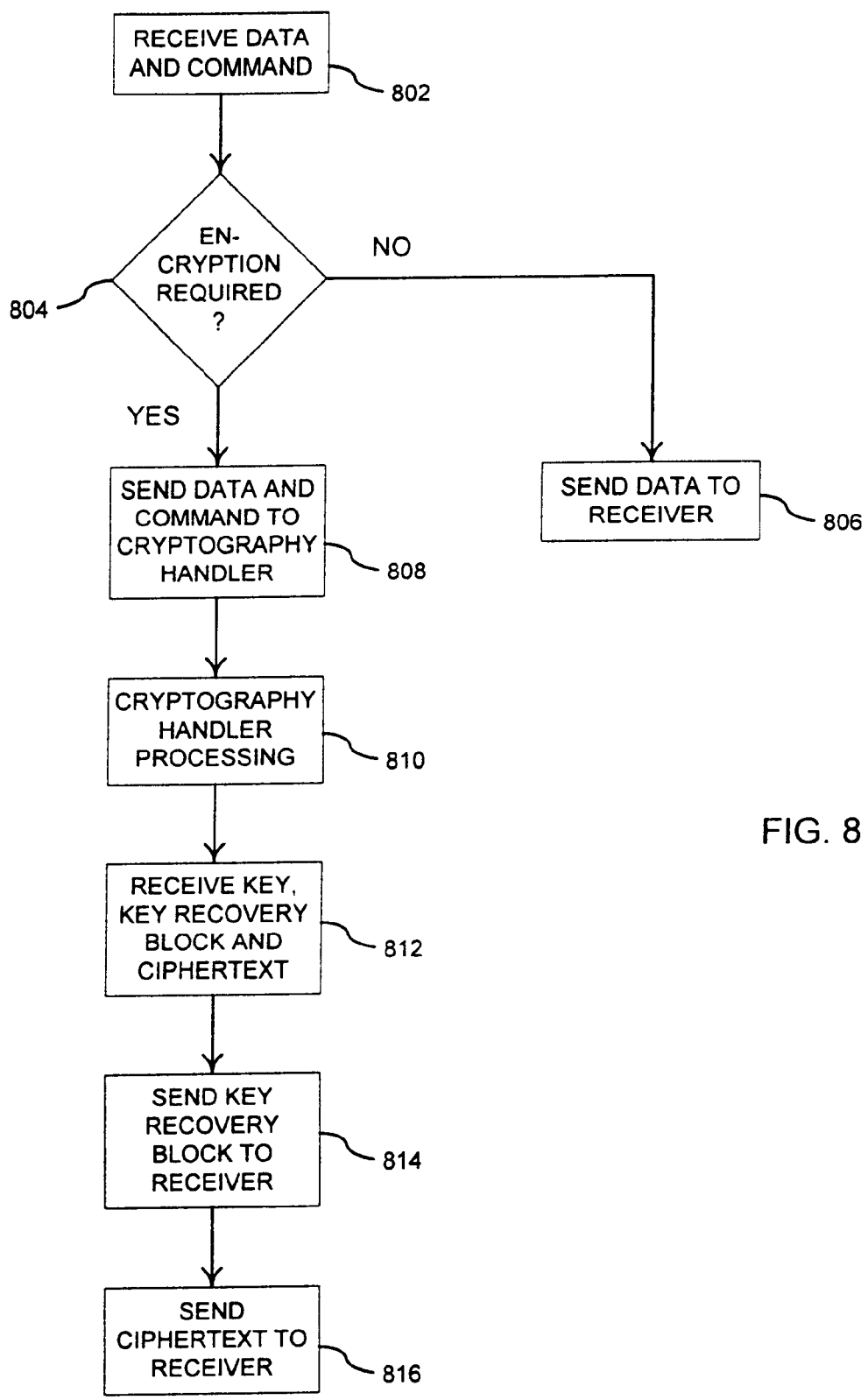
FIG. 8 is a flowchart depicting the operation of a protocol handler according to a preferred embodiment of the present invention.

FIG. 8 is a flowchart depicting the operation of protocol handler 704 according to a preferred embodiment of the present invention. When application 702 requires that data be sent over communication channel 606, it passes that data, along with suitable commands regarding transmission and the like, to protocol handler 704. For example, an email application may pass a message and a "send" command to protocol handler 704 for transmission to a receiver. Protocol handler 704 receives the data and command, as shown in step 802.

Protocol handler 704 checks the command to determine whether the data is to be encrypted, as shown in step 804. If not, protocol handler 704 sends the data to the receiver, as shown in step 806.

However, when encryption of the data is required, the data and a command to encrypt are sent to cryptography handler 706, as shown in step 808. In response, cryptography handler 706 generates a cryptography key and ciphertext encrypted with that key. In addition, if key recovery is required, cryptography handler 706 generates a key recovery block, as shown in step 810, and as described in detail with respect to FIG. 9 below. Protocol handler 704 receives the key, key recovery block, and ciphertext from cryptography handler 706, as shown in step 812.

Protocol handler 704 then sends the ciphertext, and if necessary, the key and/or key recovery block, to the receiver, as shown in steps 814 and 816.

Figure 9:
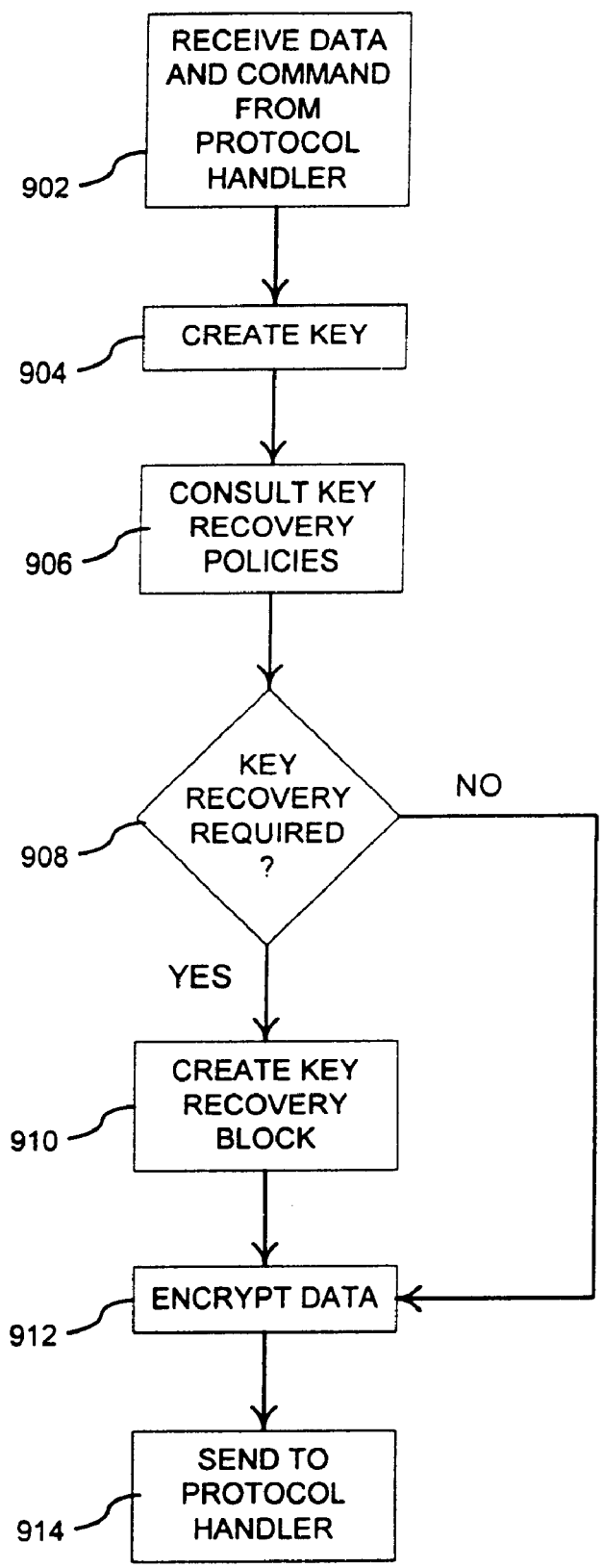
FIG. 9 is a flowchart depicting the operation of a cryptography handler according to a preferred embodiment of the present invention.

FIG. 9 is a flowchart depicting the operation of cryptography handler 706 according to a preferred embodiment of the present invention. This operation corresponds to step 810 in FIG. 8. Cryptography handler 706 receives data to be encrypted and a command specifying the encryption from protocol handler 704, as shown in step 902. Cryptography handler 704 then creates a cryptographic key, as shown in step 904. In a preferred embodiment, this accomplished by requesting a cryptography key from a cryptography service provider 712. Cryptography handler 704 also consults the key recovery policies embodied in policy module 708 to determine whether key recovery is required, as shown in step 906. If key recovery is not required, processing moves to step 912, as shown by the "no" arrow from step 908.

However, if key recovery services are required, as shown by the "yes" branch from step 908, then cryptography handler 706 creates a key recovery block, as shown in step 910. In a preferred embodiment, this is accomplished by requesting a key recovery block from a key recovery service provider 710.

Next, cryptography handler 706 uses the key created in step 904 to encrypt the data to produce ciphertext, as shown in step 912. Cryptography handler then sends the cryptography key, ciphertext, and if necessary, key recovery block, to protocol handler 704, as shown in step 914.

Figure 10:
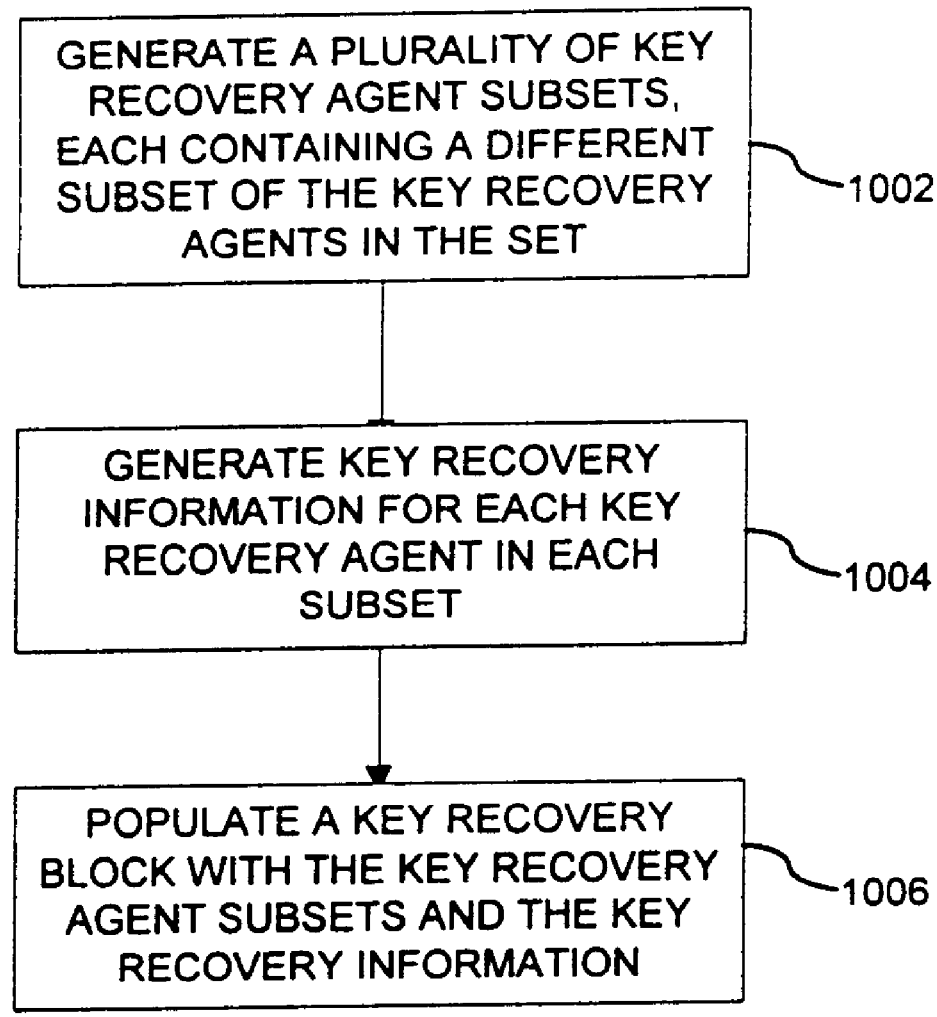
FIG. 10 is a flowchart depicting the operation of the present invention in generating a key recovery block for high availability multi-agent key recovery according to a preferred embodiment.

FIG. 10 is a flowchart depicting an operation of the present invention in generating a key recovery block for high availability multi-agent key recovery according to a preferred embodiment. According to this process, sender 602 generates a plurality of key recovery agent subsets, each containing a different subset of the key recovery agents in the set, as shown in step 1002. Then, for each subset, sender 602 generates key recovery information for each agent in that subset, as shown in step 1004.

In a preferred embodiment, key recovery information for an agent subset is generated according to the following method. The key, or parts of the key, are encrypted using the public key of one of the key recovery agents in the subset. The result is then encrypted using the public key of another one of the key recovery agents in the subset. This process is repeated for each of the remaining key recovery agents in the subset. The final result is then encapsulated within the key recovery field of the key recovery block. To recover the key or key parts, each key recovery agent in the subset in turn decrypts the key recovery field of the key recovery block using its private key. Finally, sender 602 populates a key recovery block with the key recovery agent subsets and the key recovery information generated in steps 1002 and 1004, as shown in step 1006.

Figure 7:
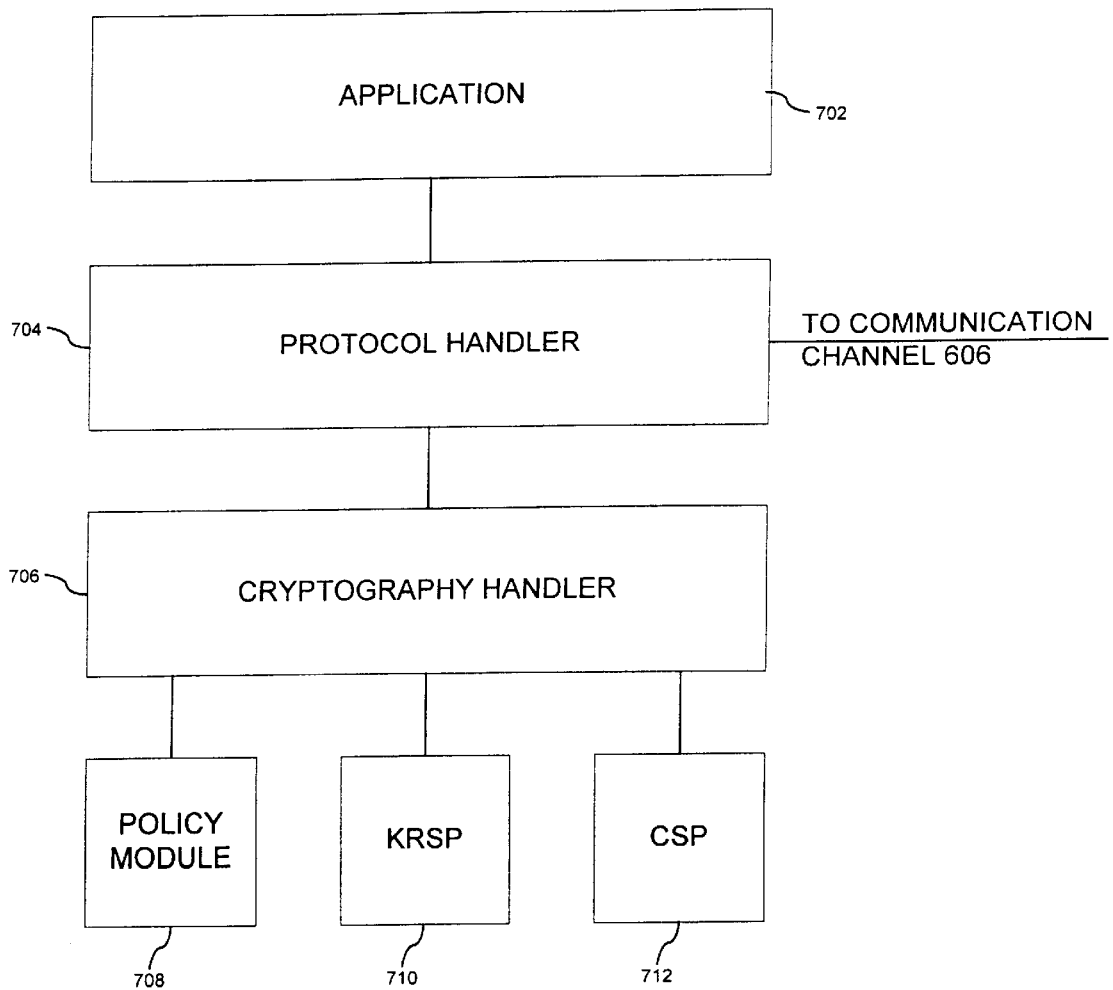
FIG. 7 depicts the architecture of a sender or receiver in a key recovery system according to a preferred embodiment of the present invention.
Figure 11:
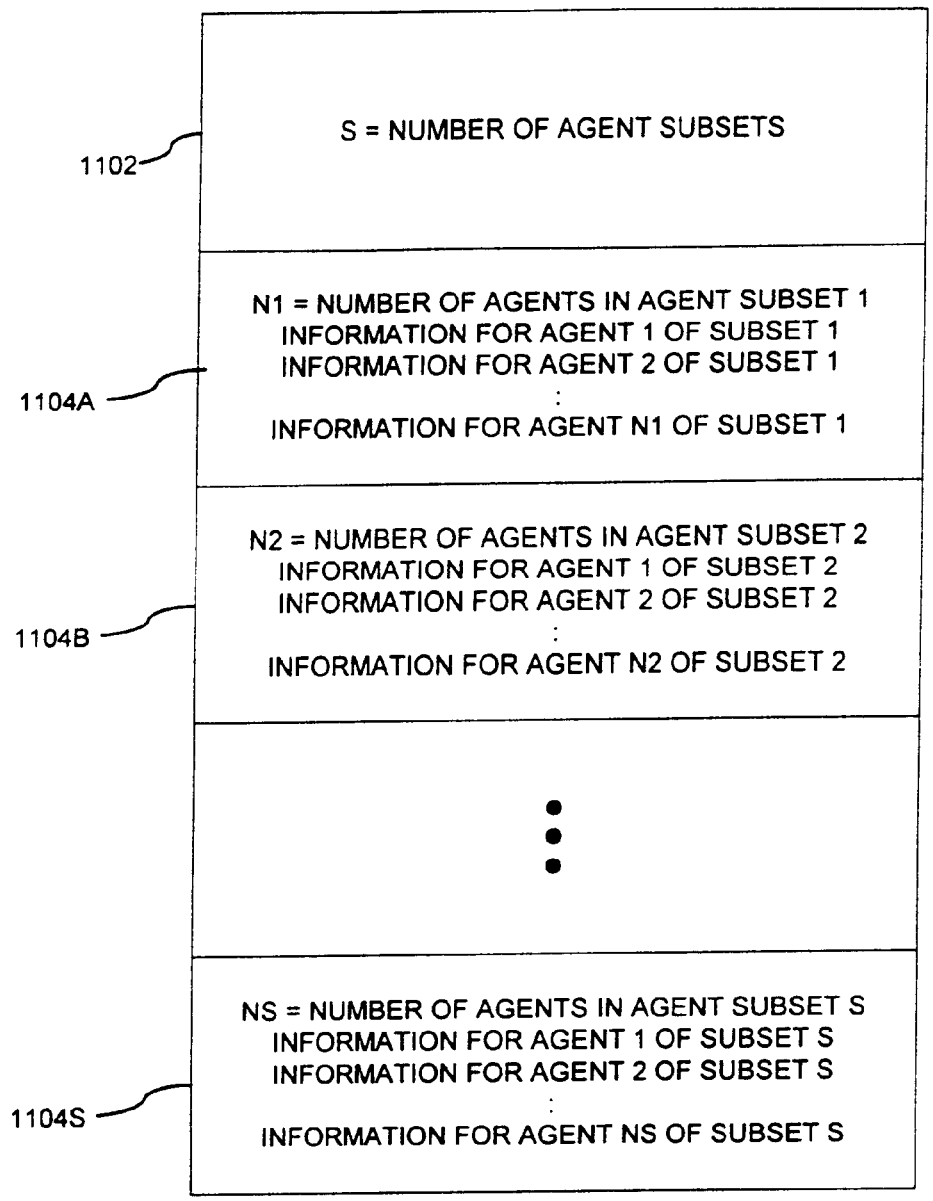
FIG. 11 depicts the format of a key recovery field in a key recovery block produced by the process of FIG. 10.

FIG. 11 depicts the format of a key recovery field 412 in a key recovery block 400 produced by the process of FIG. 7. Field 1102 specifies the number of subsets of key recovery agents that follow in the key recovery field. Field 1102 is followed by S fields 1104A–1104S, one for each agent subset. For example, returning to field 1104A, each field 1104 includes the number of agents and in that subset, and key recovery information for each agent in the subset.

Figure 12:
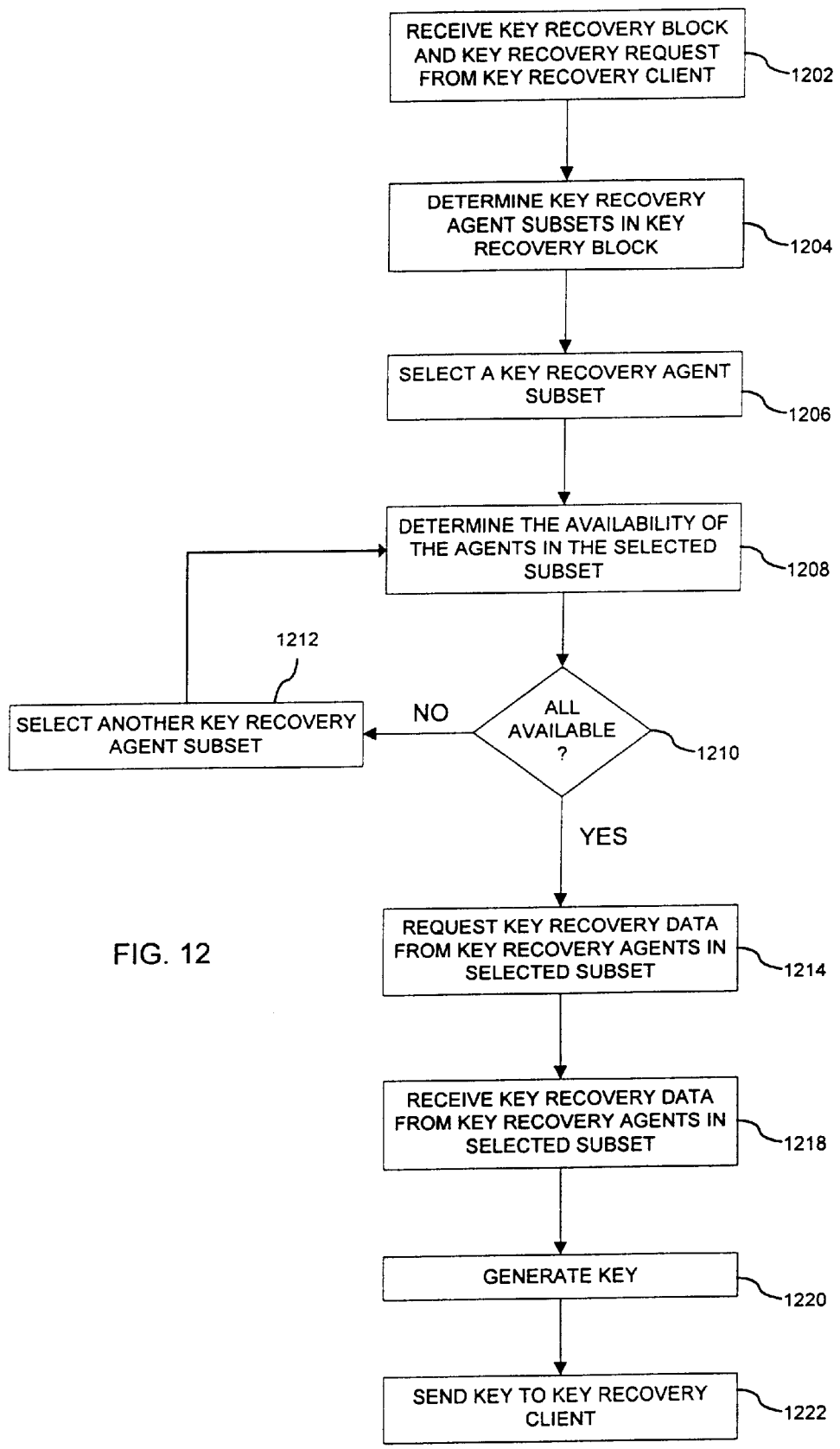
FIG. 12 is a flowchart depicting the operation of the present invention in the key recovery service phase according to a preferred embodiment.

FIG. 12 is a flowchart depicting the operation of the present invention in the key recovery service phase according to a preferred embodiment. The process of FIG. 12 is performed by key recovery coordinator 612. Key recovery coordinator 612 receives the key recovery block and a key recovery request from key recovery client 608, as shown in step 1202. In general, key recovery coordinator 612 authenticates the request to determine whether key recovery client 608 is authorized to proceed. Key recovery coordinator 612 then determines the key recovery agents' subsets by examining the key recovery block, as shown in step 1204.

Next, key recovery coordinator 612 examines each key recovery agent subset in turn to determine whether the agents in that subset are available. First, a key recovery agent subset is selected, as shown in step 1206. Then, key recovery coordinator 612 determines the availability of the agents in the selected subset, as shown in step 1208. If not all of the agents in the subset are available, as indicated by the "no" branch from step 1210, then another key recovery agent subset is selected, as shown in step 1212. When a subset is found that in which all of the agents are available, as shown by the "yes" branch from step 1210, then key recovery coordinator 612 requests key recovery information from the key recovery agents in that subset, as shown in step 1214.

In general, the key recovery agents authenticate the request to determine that key recovery coordinator 612 is authorized to proceed. The selected key recovery agents then provide the requested information. Key recovery coordinator 612 receives key recovery data, as shown in step 1218, and uses this information to generate the key, as shown in step 1220. In an alternative embodiment, the key recovery data includes the key. Key recovery coordinator 612 then sends the key to the key recovery client that requested it, as shown in step 1222.

Thus, according to the present invention, multiple key recovery agent subsets can be defined within the specified set of key recovery agents, where my specified subset is allowed or is able to generate key recovery information sufficient to regenerate the key.

Figure 13:
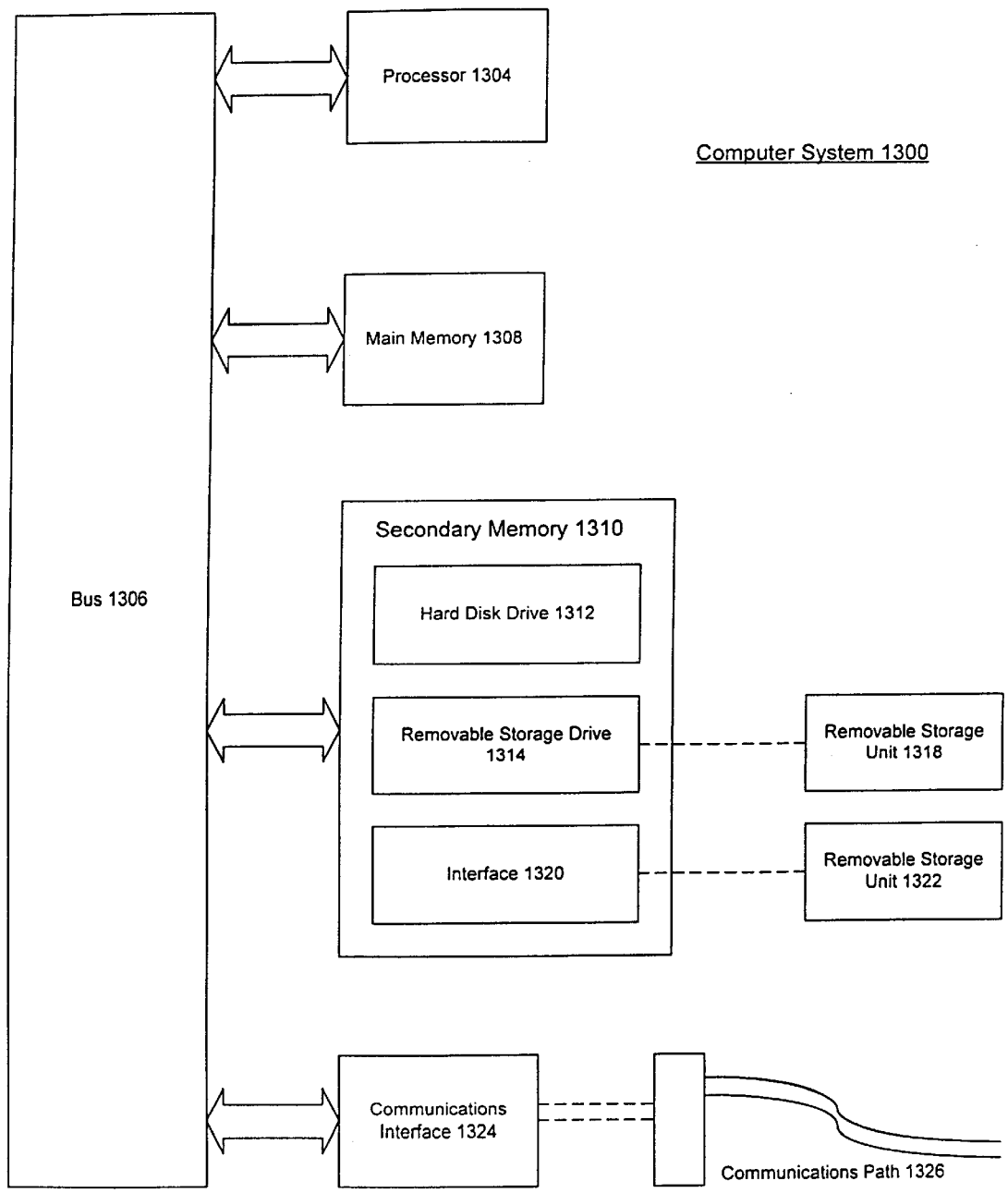
FIG. 13 depicts an example computer system in which the present invention can be implemented.

The present invention may be implemented using hardware, software or a combination thereof and may be implemented in a computer system or other processing system. In fact, in one embodiment, the invention is directed toward one or more computer systems capable of carrying out the functionality described herein. An example computer system 1300 is shown in FIG. 13. The computer system 1300 includes one or more processors, such as processor 1304. The processor 1304 is connected to a communication bus 1306. Various software embodiments are described in terms of this example computer system. After reading this description, it will become apparent to a person skilled in the relevant art how to implement the invention using other computer systems and/or computer architectures.

Computer system 1300 also includes a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318, represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar means for allowing computer programs or other instructions to be loaded into computer system 1300. Such means can include, for example, a removable storage unit 1322 and an interface 1320. Examples of such include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1318 to computer system 1300.

Computer system 1300 can also include a communications interface 1324. Communications interface 1324 allows software and data to be transferred between computer system 1300 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface 1324 via a channel 1328. This channel 1328 carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1318, a hard disk installed in hard disk drive 1312, and signals 1326. These computer program products are means for providing software to computer system 1300.

Computer programs (also called computer control logic) are stored in main memory 1308 and/or secondary memory 1310. Computer programs can also be received via communications interface 1324. Such computer programs, when executed, enable the computer system 1300 to perform the features of the present invention as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant arts that various changes in form and detail can be made without departing from the spirit and scope of the present invention. Thus the present invention should not be limited by any of the above-described exemplary embodiments, but should be defined only in accordance with the following claims and their equivalents. All cited patent documents and publications in the above description are incorporated herein by reference.

What is claimed is:

1. An apparatus for key recovery for use in a single phase key recovery system having a set of key recovery agents to recover a cryptography key, comprising:

means for receiving a key recovery block containing a plurality of key recovery agent subsets, each containing a different subset of the key recovery agents in the set and a validation field value to verify tamperproof protection of the key recovery block;

means for determining the availability of the agents in one of the plurality of key recovery agent subsets; and means for requesting key information from said agents in said one of the plurality of key recovery agent subsets when all of the agents in said one of the plurality of key recovery agent subsets are determined to be available.

2. The apparatus of claim 1, further comprising:

means for receiving key information from said available agents in said one of the plurality of key recovery agent subsets.

3. The apparatus of claim 2, further comprising:

means for generating a key based on said key information.

4. The apparatus of claim 3, further comprising:

means for receiving a key recovery request from a key recovery client; and means for sending said key to said key recovery client when one or more key agents are unavailable.

5. An apparatus for generating a key recovery block in for use in a single phase key recovery system having a set of key recovery agents to recover a cryptography key, comprising:

means for generating a plurality of key recovery agent subsets, each containing a different subset of the key recovery agents in the set and a validation field value to verify tamperproof protection of the key recovery block;

means for generating key recovery information for each key recovery agent in each subset; and means for populating a key recovery block with said plurality of key recovery agent subsets and said key recovery information.

6. The apparatus of claim 5, wherein said means for generating key recovery information comprises:

means for encrypting the cryptography key using a public key of one of the key recovery agents to produce a result; and means for encrypting said result using the public key of a different one of the key recovery agents.

7. A method for key recovery for use in a single phase key recovery system having a set of key recovery agents to recover a cryptography key, comprising the steps of:

receiving a key recovery block containing a plurality of key recovery agent subsets, each containing a different subset of the key recovery agents in the set and a validation field value to verify tamperproof protection of the key recovery block;

determining the availability of the agents in one of the plurality of key recovery agent subsets; and when all of the agents in said one of the plurality of key recovery agent subsets are determined to be available, requesting key information from said agents in said one of the plurality of key recovery agent subsets.

8. The method of claim 7, further comprising the step of:

receiving key information from said available agents in said one of the plurality of key recovery agent subsets.

9. The method of claim 8, further comprising of step of:

generating a key based on said key information.

10. The method of claim 9, further comprising the steps of:

receiving a key recovery request from a key recovery client; and sending said key to said key recovery client when one or more key agents are unavailable.

11. A method for generating a key recovery block in for use in a single phase key recovery system having a set of key recovery agents to recover a cryptography key, comprising the steps of:

generating a plurality of key recovery agent subsets, each containing a different subset of the key recovery agents in the set and a validation field value to verify tamper-proof protection of the key recovery block;

generating key recovery information for each key recovery agent in each subset; and populating a key recovery block with said plurality of key recovery agent subsets and said key recovery information.

12. The method of claim 11, wherein said step of generating key recovery information comprises the steps of:

encrypting the cryptography key using a public key of one of the key recovery agents to produce a result; and encrypting said result using the public key of a different one of the key recovery agents.

13. A computer program product for key recovery for use in a single phase key recovery system having a set of key recovery agents to recover a cryptography key, said computer program product comprising:

a computer usable medium having computer readable program code means embodied in said medium, said computer readable program code means comprising:

a computer readable first program code means for causing a computer to receive a key recovery block containing a plurality of key recovery agent subsets, each containing a different subset of the key recovery agents in the set and a validation field value to verify tamperproof protection of the key recovery block;

a computer readable second program code means for causing a computer to determine the availability of the agents in one of the plurality of key recovery agent subsets; and a computer readable third program code means for causing a computer to request key information from said agents in said one of the plurality of key recovery agent subsets when all of the agents in said one of the plurality of key recovery agent subsets are determined to be available.

14. The computer program product of claim 13, wherein said computer readable program code means further comprises:

a computer readable program code means for causing a computer to receive key information from said available agents in said one of the plurality of key recovery agent subsets and a validation field value to verify tamperproof protection of the key recovery block.

15. The computer program product of claim 14, wherein said computer readable program code means further comprises:

a computer readable program code means for causing a computer to generate a key based on said key information.

16. The computer program product of claim 15, wherein said computer readable program code means further comprises:

a computer readable program code means for causing a computer to receive a key recovery request from a key recovery client; and a computer readable program code means for causing a computer to send said key to said key recovery client when one or more key agents are unavailable.

17. A computer program product for generating a key recovery block in for use in a key recovery system having a set of key recovery agents to recover a cryptography key, said computer program product comprising:

a computer usable medium having computer readable program code means embodied in said medium, said computer readable program code means comprising:

a computer readable first program code means for causing a computer to generate a plurality of key recovery agent subsets, each containing a different subset of the key recovery agents in the set;

a computer readable second program code means for causing a computer to generate key recovery information for each key recovery agent in each subset; and a computer readable third program code means for causing a computer to populate a key recovery block with said plurality of key recovery agent subsets and said key recovery information.

18. The computer program product of claim 17, wherein said computer readable second program code means further comprises:

a computer readable program code means for causing a computer to encrypt the cryptography key using a public key of one of the key recovery agents to produce a result; and a computer readable program code means for causing a computer to encrypt said result using the public key of a different one of the key recovery agents.

19. A key recovery block for use in a single phase key recovery system having a set of key recovery agents to recover a cryptography key, the key recovery block comprising:

a subset number field that specifies a number of subsets S of the key recovery agents that can recover the cryptography key;

an object identifier that specifies the organization responsible for key recovery and key recovery fields;

a validation field value which verifies tamperproof protection of the key recovery block; and S subset fields, each having a key recovery agent number field that specifies the number of key recovery agents in the subset, and a plurality of key recovery agent fields, each specifying a key recovery agent and key recovery information for that key recovery agent.

\* \* \* \* \*